(12) United States Patent
Frederiksen

(10) Patent No.: US 6,321,552 B1
(45) Date of Patent: Nov. 27, 2001

(54) WASTE HEAT RECOVERY SYSTEM

(75) Inventor: Svend Frederiksen, Copenhagen Ø (DK)

(73) Assignee: Silentor Holding A/S, Hedehusene (DK)

(*) Notice: Subject to any disclaimer, the term of this patent is extended or adjusted under 35 U.S.C. 154(b) by 0 days.

(21) Appl. No.: 09/720,470

(22) PCT Filed: Jun. 22, 1999

(86) PCT No.: PCT/DK99/00346

§ 371 Date: Mar. 6, 2001

§ 102(e) Date: Mar. 6, 2001

(87) PCT Pub. No.: WO99/67102

PCT Pub. Date: Dec. 29, 1999

(30) Foreign Application Priority Data

Jun. 22, 1998 (DK) .................................. 1998 00886
Oct. 15, 1998 (DK) .................................. 1998 01317

(51) Int. Cl.$^7$ ............... F25B 27/00; F01B 9/02; F02B 33/00; F02B 29/04

(52) U.S. Cl. ............ 62/238.3; 62/323.2; 123/41.23; 123/563; 60/599

(58) Field of Search ................ 62/238.3, 238.1, 62/323.1, 323.2; 123/41.23, 563; 60/599

(56) References Cited

U.S. PATENT DOCUMENTS

| | | | |
|---|---|---|---|
| 2,783,622 | * 3/1957 | Bourassa | 62/238.3 |
| 4,270,365 | 6/1981 | Sampietro | |
| 5,259,196 | * 11/1993 | Faulkner et al. | 60/599 |
| 5,537,837 | * 7/1996 | Hsieh | 62/238.3 |
| 5,555,738 | * 9/1996 | DeVault | 62/238.3 |
| 5,730,089 | * 3/1998 | Morikawa et al. | 123/41.14 |
| 6,082,094 | * 7/2000 | Longardner et al. | 60/39.33 |

FOREIGN PATENT DOCUMENTS

| | | |
|---|---|---|
| 3501029 | 7/1986 | (DE) . |
| 4142314 | 9/1993 | (DE) . |
| 0350764 | 1/1990 | (EP) . |
| 2718189 | 10/1995 | (FR) . |
| 9302328 | 2/1993 | (WO) . |

* cited by examiner

*Primary Examiner*—William Doerrler
(74) *Attorney, Agent, or Firm*—Birch, Stewart, Kolasch & Birch, LLP

(57) ABSTRACT

A system for providing cooling incorporates a combustion engine (1, 2) equipped with an exhaust heat recovering heat exchanger (3) which is adapted to transfer heat energy to a heat-driven chiller (4) in which cooling can be extracted from one or more heat carrier circuits (8). The cooling thereby provided may be used for cooling of engine charge air or compressor air and/or for providing cooled air for human comfort and/or for goods. Use of heat energy derived from the engine exhaust gas flow can be added to the system. Exhaust or air intake heat exchangers may provide silencing or gas cleaning of air or gas. The system may, e.g., be applied to vehicles. Compact absorption chillers may be used in the system. A method for providing cooling is disclosed.

56 Claims, 1 Drawing Sheet

WASTE HEAT RECOVERY SYSTEM

Figure 1:
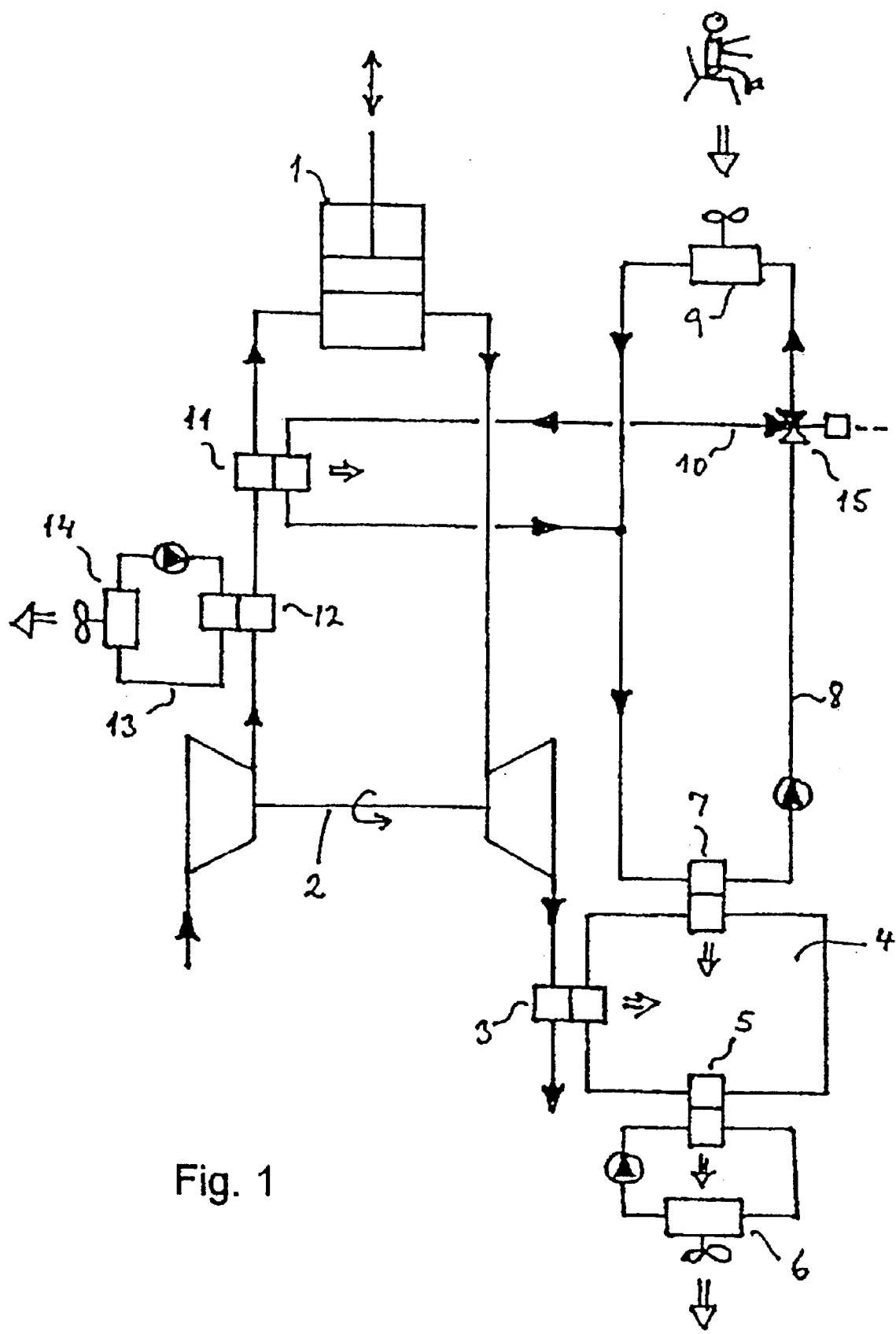

This application is the national phase under 35 U.S.C. § 371 of PCT International Application No. PCT/DK99/00346 which has an International filing date of Jun. 22, 1999, which designated the United States of America.

TECHNICAL FIELD

The present invention relates to system and a method for providing cooling in a system comprising a combustion engine.

BACKGROUND OF THE INVENTION

In vehicles air conditioning is normally based on compressor driven cooling devices. Stationary cooling plants may instead be based on heatdriven absorption chillers, normally incorporating ammonia - water or water - LiBr pairs of substances. New types of absorptive chillers are continuously being developed, in particular in the US and Japan (such as by the Heat Pump Technology Centre of Japan in Tokyo).

A prior art type of heat-driven chiller, which was in wide use some decades ago, for instance on board ships, is the steam/water ejector chiller. Recently this type of apparatus has been suggested as a cooling device to be installed in buildings, driven by heat supplied by a district heating system.

BRIEF DESCRIPTION OF THE INVENTION

The present invention defines a system and a method in which a heat-driven chiller, for instance an absorption chiller, converts engine exhaust heat energy into cooling, which is utilized for one or more useful purposes, such as cabin air conditioning for human comfort, and engine charge air cooling with the aim of improving engine performance. Use of heat energy derived from the engine exhaust gas flow can be added to the system. Furthermore, exhaust and/or air intake heat exchangers can be designed to provide silencing and/or air/gas cleaning of engine intake/exhaust.

It can be foreseen that absorption chillers will soon be developed which are much more compact than conventional chillers, and which are capable of performing satisfactorily even when exposed to movements which occur in a vehicle installation. Such new types of absorption chillers may be based on less conventional pairs of substances, for instance organic media.

A steam/water ejector chiller may be incorporated in the system according to the invention or used in the method according to the invention. From an environmental point of view it appears attractive that such a chiller can work on pure steam/water. When adapted to mobile applications, as suggested in the present invention, this feature could prove particularly useful, since such application may imply a great number of vehicles, usually being operated and sometimes also being repaired by people who are not engineers. In addition, the very environmentally friendly medium may provide reduced risks in case of vehicle collisions.

The present invention is particularly useful when applied to vehicles such as trucks, busses or passenger cars in which the cooling provided may, e.g., be used for air conditioning cooling for human comfort or cooling of compressed air emerging from a supercharger.

DETAILED DESCRIPTION OF THE INVENTION

FIG. 1 describes a preferred embodiment of the invention in principle, as typically applied to a vehicle. Here, 1 is a piston engine prime mover with a turbo supercharger, 2. A waste heat recovery boiler or heat exchanger, 3, recovers part of the exhaust heat energy, thereby cooling the exhaust gas. This heat energy is transferred, either directly, as shown in the figure, or via an intermediate cooling loop, to a heat-driven chiller, 4. This chiller dumps heat to the environment via heat exchanger 5 and cooler 6. Via heat exchanger 7 cooling energy is extracted from a circuit 8, typically incorporating circulating water as a heat carrier. The forward water, for instance having a temperature of 5 degrees C, is distributed, both to a heat exchanger 9, being part of the ventilating system of the vehicle, and (via forward pipe 10) to a secondary charge air cooler, 11, performing cooling additional to the conventional sort of charge air cooling performed by cooling loop 13, extracting heat via heat exchanger 12 and cooler 14.

Depending on the type of heat-driven chiller 4, a small amount of mechanical pumping energy may be necessary to add to the chiller, to circulate the cycle medium. This is for instance so with standard absorption chillers. On the other hand, the cycle may incorporate a thermosiphon effect, which may eliminate the need for such mechanical input.

A three-way distributer valve 15 may direct cooling water, either entirely to one of heat exchangers 9 and 11, or to both in a desired proportion, depending on instantaneous demands and according to an optimal strategy, as determined by one or more control systems governing the cooling system, the engine, the ventilation system, etc. One example of such a strategy can be under summer conditions to give general priority to air conditioning, but interrupt air conditioning and increase charge air cooling when peak engine output is required, for instance when driving up-hill Further flexibility can be achieved by incorporating cooling storage capacity into one or more of the cooling circuits. Such storage can be used to limit the size of the heat-driven chiller.

From the point of view of engine fuel economy and power output it is attractive that the present system utilizes otherwise wasted heat which is converted into useful cooling. By comparison, a traditional compressor driven vehicle cooling system instead retracts from engine output and causes a significant increase in fuel consumption.

Turbo supercharging today is state of the art in diesel engines for trucks and buses in which it improves engine performance. Sometimes it is also used in gasoline engines for cars. Supercharging is often combined with charge air cooling to improve further on engine performance.

Secondary charge air cooler 11 will take engine performance another step forward. Theoretically, charge air to engine cylinders may be brought down even below ambient temperature. Due to problems with condensed water it may be necessary to limit the total amount cooling. Another strategy could be to insert a dehumidifier into the charge air supply system.

The added cooling capacity will be particularly beneficial when the ambient air temperature is high, since such an operating condition is known to affect engine performance adversely When, as enabled by the invention, ample cooling capacity is available to the charge air cooling system, this reduction in performance can be greatly or completely offset.

The heat-driven chiller 4 may be an absorption chiller or a steam/ water ejector chiller or any further type of device which performs essentially the same type of energy cycle, i.e. has an input of heat at relatively high temperature, rejects heat at a lower temperature, and produces useful cooling.

A further number of variations and refinements of the described concept are given by various subclaims below.

What is claimed is:

1. A system for providing cooling, the system incorporating a combustion engine equipped with an exhaust heat recovering heat exchanger which is adapted to transfer heat energy to a heat-driven chiller in which cooling can be extracted from one or more heat carrier circuits, the system being adapted to combine cooling of charge air or compressor air with air conditioning cooling for human comfort, said heat carrier circuits being controllable to proportion the total cooling energy in optional fractions between air conditioning means and engine charge cooling means.

2. The system according to claim 1, further comprising at least one cooling means selected from the group consisting of first cooling means for cooling of engine charge air or compressor air, second cooling means for air conditioning for human comfort, and third cooling means for cooling of goods for transportation.

3. The system according to claim 1, in which cooling is used primarily or for charge air or compressor air cooling.

4. The system according to claim 1, in which cooling is used primarily or for air conditioning.

5. The system according to claim 1, in which said combustion engine is a piston engine.

6. The system according to claim 5 in which said piston engine is equipped with a supercharger.

7. The system according to claim 5 in which said piston engine is naturally aspirated.

8. The system according to claim 6 in which said charge air cooling means cause cooling of charge air having been compressed by the compressor part of said supercharger.

9. The system according to claim 8 in which said charge air cooling is the only cooling of charge air.

10. The system according to claim 8 in which said charge air cooling is additional to and/or is combined with charge air cooling performed by means of a further cooling circuit.

11. The system according to claim 10, in which a cooler for dumping waste heat from said heat-driven chiller is combined with a cooler for extracting heat from said further cooling circuit into a common apparatus.

12. The system according to claim 1 in which said combustion engine is a gas turbine.

13. The system according to claim 12 in which said gas turbine is equipped with compressor intercooling, said intercooling being completely or partly performed by means of said chiller driven cooling means.

14. The system according to claim 1 in which said cooling means is utilized completely or partly for cooling of charge air upstream of a compressor.

15. The system according to claim 1, in which said heat-driven chiller is supplemented by heating means for transferring engine exhaust heat to room/cabin inside air and/or for providing further useful heating, such as for instance ice melting.

16. The system according to claim 1, in which said exhaust heat recovery recovering heat exchanger is designed so as to additionally cause sound reduction and/or exhaust gas cleaning.

17. The system according to claim 14 in which said cooling means incorporate a heat exchanger being designed so as to additionally cause sound reduction and/or air cleaning.

18. The system according to claim 1 in which an extra heat carrier circuit is interposed between said exhaust recovering heat exchanger and said heat-driven chiller, said circuit containing a circulated heat carrier medium, said medium being a liquid, e.g. water, or a gas, e.g. carbon dioxide or nitrogen, or an evaporating liquid.

19. The system according claim 1 in which said exhaust heat recovering heat exchanger is equipped with a bypass channel and with valves/dampers leading an optional part of the exhaust gas to flow uncooled through said bypass channel.

20. The system according to claim 1, in which said heat carrier circuits are equipped with a three-way valve which can be controlled to proportion the total cooling energy in optional fractions between said air conditioning means and said engine charge cooling means.

21. The system according to claim 1 in which cooling and/or heating storage capacity is installed into one or more heat carrier circuits, to allow for additional freedom when shifting between various operational modes.

22. The system according to claim 1 in which said combustion engine is the prime mover of a vehicle.

23. The system according to claim 1 in which said combustion engine is the prime mover of a boat.

24. The system according to claim 1 in which said heat-driven chiller is an absorption chiller.

25. The system according to claim 1 in which said heat-driven chiller is a steam/water ejector chiller.

26. The system according to claim 24 in which said absorption chiller incorporates a thermosiphon effect with the purpose of circulating the cycle medium without addition of mechanical energy to the cycle.

27. The system according to claim 24 in which said absorption chiller is based on LiBr and water.

28. The system according to claim 24 in which said absorption chiller is based on two or more working media, at least one of said media being an organic substance.

29. A method for providing cooling in a system incorporating a combustion engine and an exhaust heat recovering heat exchanger, the method comprising transferring heat energy to a heat-driven chiller and, in said chiller, extracting cooling from at least one heat carrier circuit, the method comprising combining of cooling of charge air or compressor air with air conditioning cooling for human comfort, and proportioning, by control of said heat carrier circuits, the total cooling energy in optional fractions between air conditioning means and engine charge cooling means.

30. The method according to claim 29, comprising at least one of the following steps: cooling engine charge air or compressor air, air conditioning surroundings of humans, cooling goods for transportation.

31. The method according to claim 29, in which cooling is used primarily or for charge air or compressor air cooling.

32. The method according to claim 29, in which cooling is used primarily or for air conditioning.

33. The method according to claim 29, in which said combustion engine is a piston engine.

34. The method according to claim 33 in which said piston engine is equipped with a supercharger, the method comprising supercharging intake air by means of the supercharger.

35. The method according to claim 33, comprising naturally aspirating said piston engine.

36. The method according to claim 34 in which said charge air cooling means cause cooling of charge air having been compressed by the compressor part of said supercharger.

37. The method according to claim 35 in which charge air is solely cooled by said charge air cooling.

38. The method according to claim 34 in which said charge air cooling is additional to and/or is combined with charge air cooling performed by means of a further cooling circuit.

39. The method according to claim 37, further comprising dumping waste heat from said heat-driven chiller by means of a cooler, and wherein heat is extracted from said further cooling circuit in a common apparatus by means of a cooler.

40. The method according to claim 29 in which said combustion engine is a gas turbine.

41. The method according to claim 39 in which said gas turbine is equipped with compressor intercooling, said intercooling being completely or partly performed by means of said chiller driven cooling means.

42. The method according to claim 29 in which said cooling means is utilized completely or partly for cooling of charge air upstream of a compressor.

43. The method according to claim 29, in which said heat-driven chiller is supplemented by heating means for transferring engine exhaust heat to room/cabin inside air and/or for providing further useful heating, such as for instance ice melting.

44. The method according to claim 29, in which said exhaust heat recovering heat exchanger causes sound reduction and/or exhaust gas cleaning.

45. The method according to claim 41 in which said cooling means incorporate a heat exchanger which cause sound reduction and/or air cleaning.

46. The method according to claim 29 in which an extra heat carrier circuit is interposed between said exhaust heat covering heat exchanger and said heat-driven chiller, said circuit containing a circulated heat carrier medium, said medium being a liquid, e.g. water, or a gas, e.g. carbon dioxide or nitrogen, or an evaporating liquid.

47. The method according to claim 29 in which said exhaust heat recovering heat exchanger is equipped with a bypass channel and with valves/dampers leading an optional part of the exhaust gas to flow uncooled through said bypass channel.

48. The method according to claim 29, in which said heat carrier circuits are equipped with a three-way valve, the method comprising the step of controlling, by means of the three-way-valve, proportioning the total cooling energy in optional fractions between said air conditioning means and said engine charge cooling means.

49. The method according to claim 29 in which cooling and/or heating storage capacity is installed into one or more heat carrier circuits, to allow for additional freedom when shifting between various operational modes.

50. The method according to claim 29 in which said combustion engine is operated as the prime mover of a vehicle.

51. The method according to claim 29 in which said combustion engine is operated as the prime mover of a boat.

52. The method according to claim 29 in which said heat-driven chiller is an absorption chiller.

53. The method according to claim 29 in which said heat-driven chiller is a steam/water ejector chiller.

54. The method according to claim 51 in which said absorption chiller incorporates a thermosiphon effect with the purpose of circulating the cycle medium without addition of mechanical energy to the cycle.

55. The method according to claim 51 in which said absorption chiller is based on LiBr and water.

56. The method according to claim 51 in which said absorption chiller is based on two or more working media, at least one of said media comprising an organic substance.

* * * * *